United States Patent [19]
Durham

[11] Patent Number: 5,649,795
[45] Date of Patent: Jul. 22, 1997

[54] MACHINE TOOL

[75] Inventor: Lawrence H. Durham, Los Angeles, Calif.

[73] Assignee: The Gillette Company, Boston, Mass.

[21] Appl. No.: 561,700

[22] Filed: Nov. 22, 1995

[51] Int. Cl.[6] .................................................. B23B 31/10
[52] U.S. Cl. ........................... 408/189; 408/193; 408/225; 408/231; 408/239 R; 279/145
[58] Field of Search .............................. 408/22, 24, 25, 408/30, 189, 193, 194, 196, 223, 224, 225, 231, 233, 238, 239 R, 239 A, 240; 279/42, 48, 52, 145

[56] References Cited

U.S. PATENT DOCUMENTS

| | | | |
|---|---|---|---|
| 2,891,429 | 6/1959 | Fragge | 408/193 |
| 3,228,267 | 1/1966 | Hebert | 408/193 |
| 3,587,124 | 6/1971 | Cox et al. | 408/240 |
| 3,719,367 | 3/1973 | Baturka | 279/145 |

*Primary Examiner*—Daniel W. Howell
*Attorney, Agent, or Firm*—Owen J. Meegan; Aubrey C. Brine; Donal B. Tobin

[57] ABSTRACT

A device for performing a plurality of operations on a workpiece has a combination tool holder and a rotatable spindle for retaining the tool holder. The combination tool holder has a central opening at its forward end for receiving a drill bit and a pair of forwardly extending bosses onto which a pair of cutting tools are received. A slot is provided in the tool holder dividing it into a pair of gripping elements receiving the drill bit, the gripping elements being forced together onto the drill bit when the tool holder is mounted in the spindle.

16 Claims, 3 Drawing Sheets

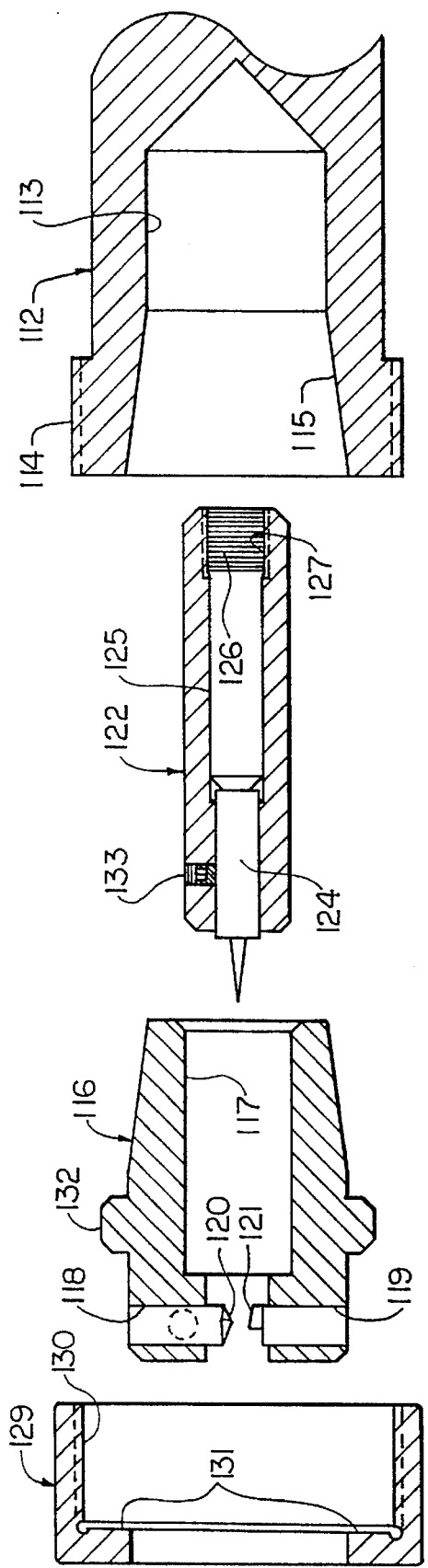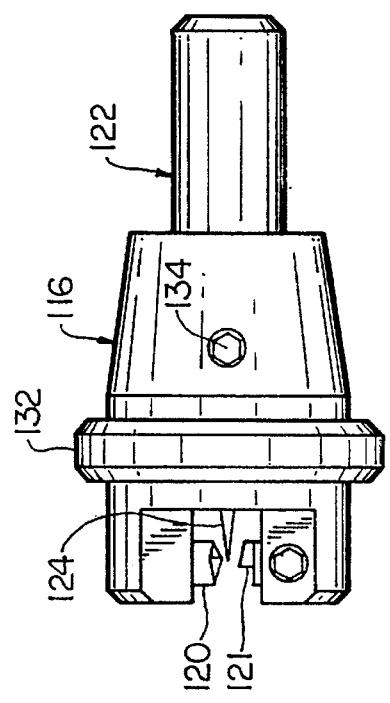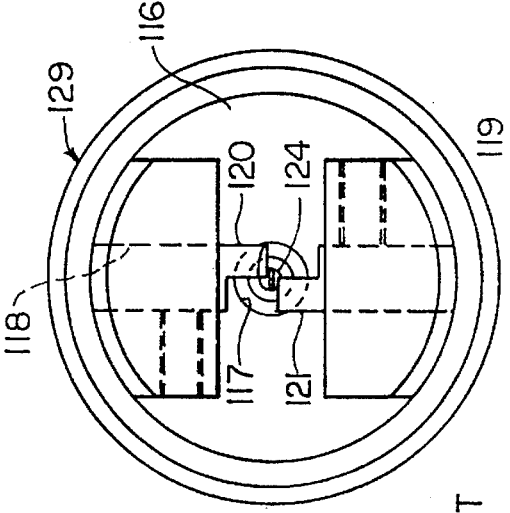
FIG. 1 PRIOR ART
FIG. 2 PRIOR ART
FIG. 3 PRIOR ART

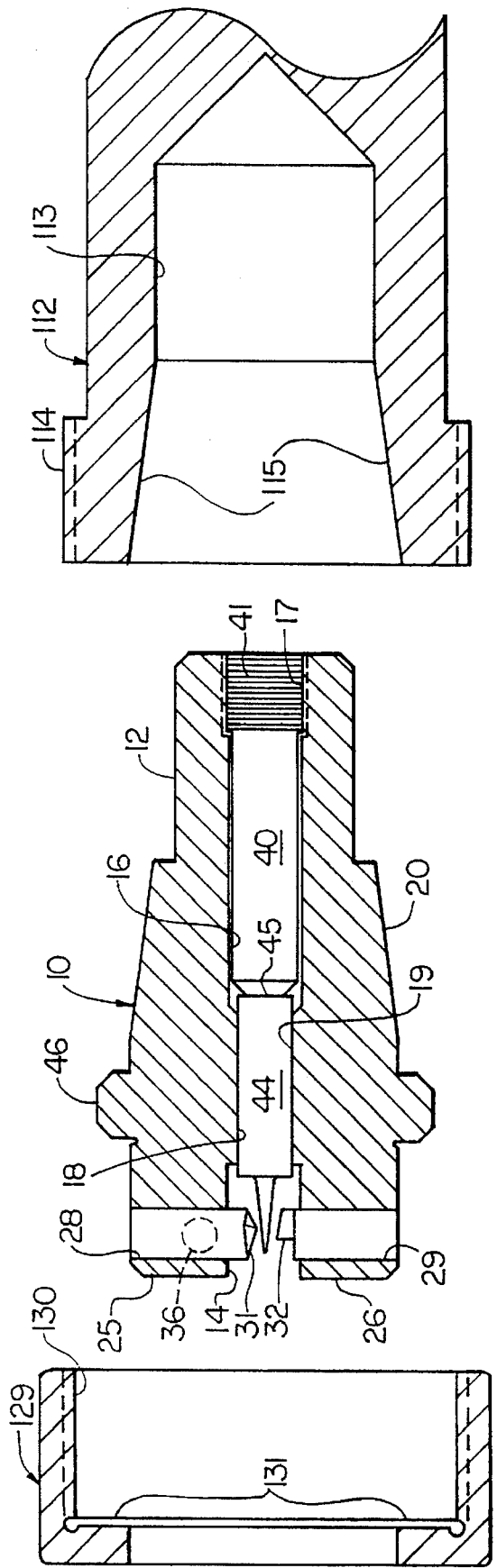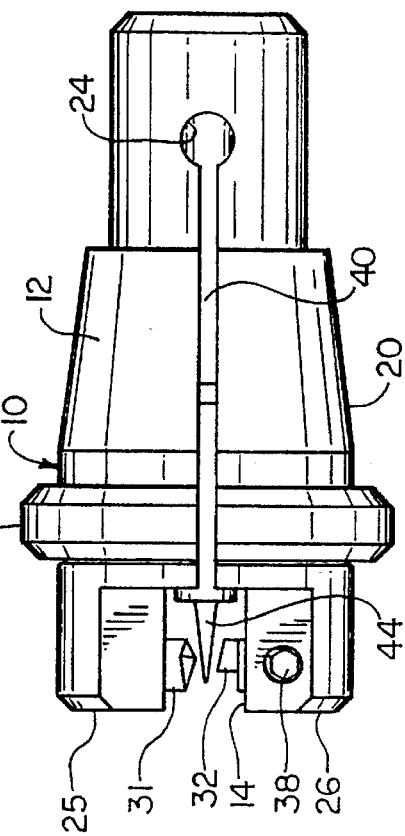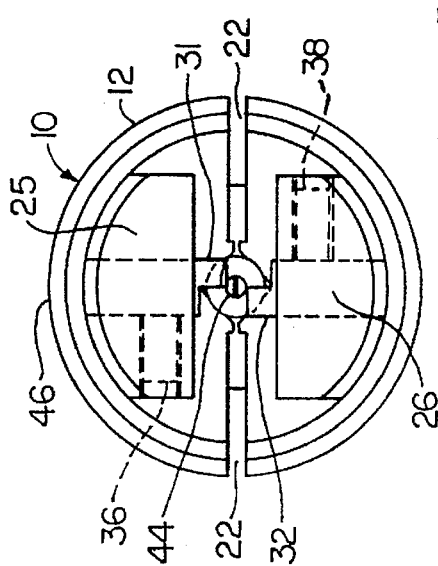

MACHINE TOOL

BACKGROUND OF THE INVENTION

The present invention relates to a device for performing a plurality of operations on a workpiece, and more particularly to a device having a combination tool holder for performing a drilling operation simultaneously with one or more machining operations.

There are a great many operations in the manufacture of extremely small articles such as, for example, the point of a ballpoint pen, which involve what is generally known as "micromachining" operations. These operations generally require tools and fixtures which are capable of maintaining unusually high degrees of precision together with the capability of maintaining the precision with repeated accuracy during mass production operations.

One such tool of the prior art employed in the manufacture of ballpoint pen tips provides a socket drill and two additional tools in proper relationship to machine the outer surface of the point. The tool holder generally provides a separate drill holder shaft that is a slip-fit into the tool head body, and locked by a setscrew. The drill is also a slip-fit in the drill holder shaft bore, and also is secured by means of a setscrew. These slip-fits have tendency to cause a problem in that 1/10,000 of an inch off center at each area can result in up to four times that in the ballpoint socket, creating problems with tool life and with writing quality in the finished product. While attempts are generally made to keep the sliding fit errors under control, it is generally difficult to obtain tool blanks which may be held with the required accuracy. In many instances, the variations are compensated by grinding the drill point diameter undersized, and radially repositioning the drill holder combination by trial until the errors cancel each other, to the extent that an acceptable product is achieved.

With any slip-fit, setscrew mounting there is a related problem in a reduction of tool rigidity in that there is only line contact on one side of the holder shaft or drill shank and only point contact on the opposite side where the setscrew is located allowing flex and vibration, two known enemies of precision machining in the micromachining art.

It is therefore an object of the present invention to provide a device for performing a plurality of operations on a workpiece of microdimension which provides increased precision over those devices of the prior art.

Another object of the invention is to provide a device of the above-mentioned type which is simple to manufacture and easy to employ.

Another object of the invention is to provide a combination tool holder for performing a plurality of operations on a microdimensioned workpiece which contains a drill bit and wherein the drill bit is retained with a minimum of flex and vibration.

Yet another object of the invention is to provide a combination tool holder of the above type wherein the drill bit is retained in a more rigid manner than those devices of the prior art.

SUMMARY OF THE INVENTION

The above objects, and other objects which will become apparent as the description proceeds, are accomplished by providing a device for performing a plurality of operations on a workpiece which comprises a combination tool holder and a rotatable spindle for retaining the tool holder therein.

The tool holder comprises a substantially cylindrical body having a central opening provided at the forward end and an outer surface having a rearwardly inwardly tapered portion. At least one slot is formed through the body and intersecting the central opening, the slot extending from the forward end of the body rearwardly into the tapered portion of the outer surface, and one or more bosses extend forwardly from the body, the boss or bosses having means for receiving and retaining tool means thereon.

The rotatable spindle comprise a forwardly facing cavity have a rearwardly inwardly tapered surface for receiving the rearwardly tapered surface of the tool holder body. Means are provided for forcing the tool holder rearwardly into the cavity with the rotatable spindle and tool holder body rearwardly inwardly tapered surfaces in contact to thereby compress the tool holder body and force the slot toward closure.

The slot generally divides the tool holder into a pair of tool gripping elements, and the slot may extend beyond the tapered outer surface.

Each of the tool gripping elements into which the combination tool holder may be divided comprises a pair of surfaces forming a substantial V-shape which extends axially in the opening. The V-shaped surface of each of the tool gripping elements has a radial surface formed substantially at the center thereof which extends axially in the opening.

With the tool holder divided into the pair of gripping elements, each of said gripping elements generally contain one the bosses having means for receiving and retaining a tool thereon.

BRIEF DESCRIPTION OF THE DRAWING

Reference is made to the accompanying drawing in which there is shown an illustrative embodiment of the invention from which its novel features and advantages will be apparent, wherein:

FIG. 1 is an elevational exploded view, partially in section, showing a device for simultaneously performing a plurality of operations on a workpiece, which device is constructed in accordance with the prior art;

FIG. 2 is a front elevational view showing the elements of FIG. 1 in the assembled condition;

FIG. 3 is an elevational view showing two elements of the structure of FIG. 1 in the assembled condition;

FIG. 4 is an elevational exploded view, partially in section, showing a device of the type shown in FIG. 1, which has been constructed in accordance with the teachings of the present invention;

FIG. 5 is a front elevational view showing elements of the device depicted in FIG. 4;

FIG. 6 is an elevational side view of the structure of FIG. 5 showing details of the structure.

DESCRIPTION OF THE PREFERRED EMBODIMENT

Figure 7A:
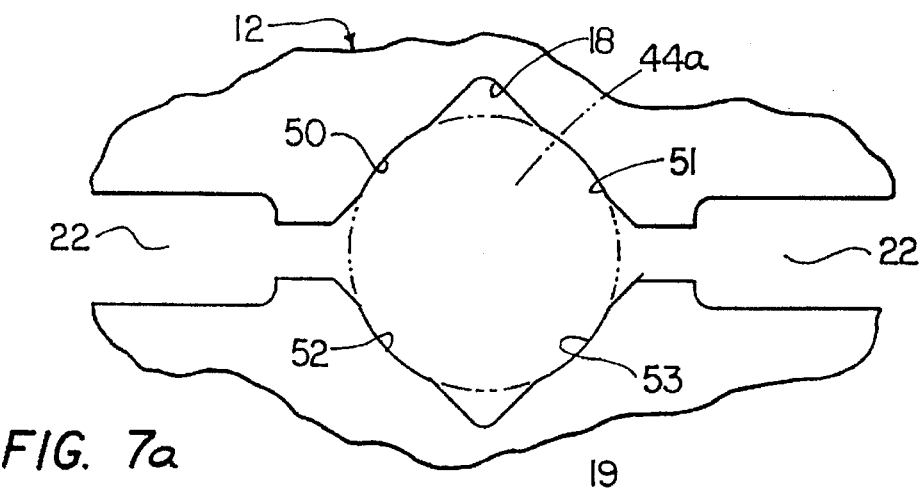
FIGS. 7a, 7b and 7c are fragmentary elevational views showing a portion of an element of the structure of FIGS. 4 through 6, depicted on an enlarged scale for clarity.

Referring now to the drawing and in particular to FIGS. 1, 2 and 3, a device for performing a plurality of machining operations simultaneously on an article, for instance a ballpoint pen tip, is shown to comprise a rotatable spindle 112 attached to a suitable motor device (not shown) which is effective to cause rotation to the spindle as well as linear movement to and away from the workpiece during a step in the production of a ballpoint pen tip. As will be noted, the spindle 112 has a central opening 113 formed therein, and is provided with external threads 114 at its forward end and a rearwardly inwardly tapered surface 115 at the forward end of the opening 113.

A substantially cylindrical tool holder 116 is provided with a central bore 117 and a pair of rectangular openings 118 and 119 for receiving cutting tools 120 and 121.

An elongated drill holder 122 having a cylindrical outer surface is provided with a drill bit 124 received at its forward end, the drill bit being axially located in the drill holder 122 by a stop screw 125. The stop screw 125 is provided with external threads 126 which are received in the internal threads 127 provided in the drill holder 122. The drill bit 124, while located axially in the drill holder 122 by the stop screw 125, is locked in position by means of a setscrew 133, as best seen in FIG. 1.

In like manner, the drill holder 122 is received in a cylindrical opening in the central bore 117 formed in the tool holder 116 and is retained by a setscrew 134 to provide the assembly shown in FIG. 3. The tool holder 116 is then assembled into the opening 113, with its outer surface contacting the rearwardly inwardly tapered surface 115 and a spindle cap 129 has internal threads 130 which are received by the threads 114. The tool holder 116 is retained in place axially by contact of an inner surface 131 of the spindle cap with an outwardly extending flange 132 of the tool holder 116.

While tool holders of the type described with reference to FIGS. 1 through 3 have proven to be successful in the machining of extremely small parts, problems of run out in the machining process may occur. There is generally a clearance of between 0.0002 inches and 0.001 inches between the shank of the drill bit 124 and the internal bore of the drill bit holder 122. Typically there may be a clearance of between 0.0002 inches to 0.0005 inches between the outside diameter of the drill bit holder and the cylinder opening 117. A run out of 0.001 inches to 0.0015 inches may occur at the drill point due to the above factors.

Referring now to FIGS. 4, 5 and 6, there is shown a device for simultaneously performing a plurality of operations on a workpiece which is constructed in accordance with the teachings of the present invention, and which is adaptable to be operated by and received in a spindle 112, such as a spindle described with reference to FIGS. 1, 2 and 3.

The device comprises a tool holder 10 comprising a substantially cylindrical body 12 having a central opening 14 extending through the body. The central opening 14 has a cylindrical surface 16 extending through the rear of the body 12 having internal threads 17 formed therein adjacent the rear of the body. The forward portion of the central opening 14 comprises an upper surface 18 and lower surface 19 which will be described in detail with reference to FIGS. 7a, 7b and 7c.

As best shown in FIG. 6, the tool holder body 12 has an outer surface 20 which is tapered rearwardly and inwardly, and a slot 22 formed through the body 12 intersecting the central opening 14 and extending from the forward end of the body into that portion of the body containing the tapered surface 20. The slot 22 terminates at a circular bore 24 disposed near the rear of the body 12. The slot 22 substantially divides the body 12 into equal upper and lower portions each containing a boss 25 or 26 which each extend forwardly from the body and contain means in the form of rectangular bores 28 and 29 for receiving and retaining a tool. In the present embodiment the rectangular bores 28 and 29 contain a cone-forming tool 31 and a facing tool 32 respectively, each of which is fixed in place by a respective setscrew 36 and 38. It should be understood that the bosses 25 and 26 may be configured to hold any of a number of tools which could be used simultaneously with a drilling operation, the tools 31 and 32 being shown only as representative of those employed in the ballpoint pen tip manufacturing process. Further, while one slot and two bosses are shown it should be understood that one or more bosses may be employed as the need arises.

A stop screw 40 having threads 41 is received in the threaded portion 17 of the central opening 14, the stop screw having a cylindrical outer surface which is disposed in spaced relation with the portion of the central opening into which it is disposed. The assembly is completed by a drill bit 44 having a cylindrical outer surface and a rear surface 45 contacting the stop member 40. The greater portion of the outer surface of the drill bit 44 lies between the upper surface 18 and the lower surface 19 of the central opening 14.

In assembling the tool holder 10 into the spindle 112 the tool holder is deposited into the spindle with the taper outer surface 20 contacting the spindle tapered surface 115 and the spindle cap 129 is screwed onto the spindle 112, the surface 131 of the spindle cap contacting a radially outwardly extending flange 46 of the tool holder body 12 forcing the tool holder 10 rearwardly into the spindle. However, in the present embodiment, inward pressure caused by contact between the tapered surface 20 and the tapered surface 115 serve to compress the tool holder body 12 providing a gripping force between the upper surface 18 and the lower surface 19 of the central opening 14. The drill bit 44 is therefore gripped firmly at the centerline of the central opening 14 by virtue of this gripping action which is applied in a manner as will be explained below with regard to FIGS. 7a, 7b and 7c.

Figure 7B:
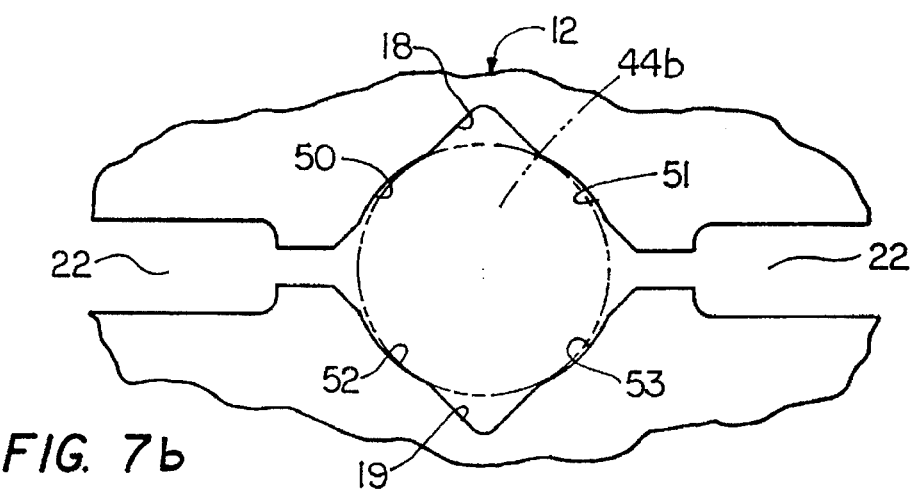
Figure 7C:
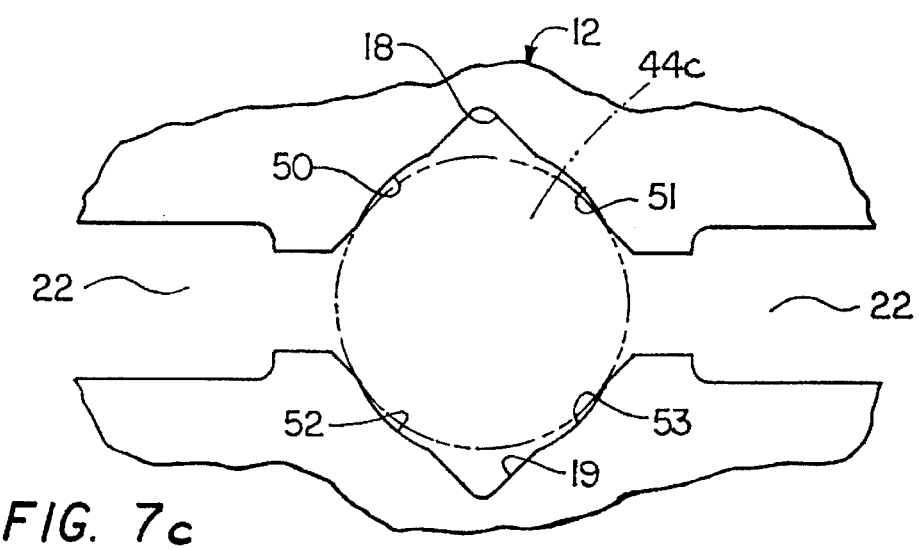

Referring to FIGS. 7a, 7b and 7c, three drill bits 44a, 44b and 44c are shown each of which has dimensional tolerances which vary one from the other, the drill bit 44a being of the nominal dimension required while the drill bit 44b is of the larger tolerance and the drill bit 44c is of the smaller tolerance allowed for the particular drill size. It will be noted that the upper surface 18 and the lower surface 19 are of a V-shape each having a radial portion 50 and 51 on the upper surface and 52 and 53 on the lower surface. As will be evident in viewing FIGS. 7a, 7b and 7c, however, the drill bits 44a, 44b and 44c are rigidly retained within the drill holder 10, drill bit 44a having four separate longitudinal surface engagements between the surfaces 50, 51, 52 and 53, drill bit 44b being retained by four distinct longitudinal linear contacts between the upper edges of the surfaces 50, 51 and the lower edges of the lower surfaces 52 and 53, while the drill bit 44c is held by linear contact along its length with the lower edges of the surfaces 50 and 51 and the upper surfaces 52 and 53. A drill bit retained within the tool holder 10 thereby is rigidly fixed with regard to axial rotation regardless of whether it is of the nominal dimension or of a greater or smaller tolerance which would be allowed for a drill bit of a miniature size.

While it is apparent that changes and modifications can be made within the spirit and scope of the present invention, it is my intention, however, only to be limited by the appended claims.

As my invention I claim:

1. A combination tool holder for performing a plurality of operations on a workpiece comprising:

a substantially cylindrical body having a central opening provided at the forward end thereof and an outer surface having a rearwardly inwardly tapered portion;

at least one slot formed through said body and intersecting said central opening, said slot extending from the forward end of said body, rearwardly into said tapered portion;

at least one boss extending forwardly from said body, and means for receiving and retaining tool means disposed on said boss.

2. A combination tool holder as set forth in claim 1 wherein two bosses extend forwardly from said body and means for receiving and retaining tool means is disposed on each said boss.

3. A combination tool holder as set forth in claim 1 wherein said slot extends beyond said tapered portion.

4. A combination tool holder as set forth in claim 1 wherein said slot divides said tool holder into a pair of tool gripping elements.

5. A combination tool holder as set forth in claim 4 wherein a portion of said central opening disposed in each said tool gripping element comprises a pair of surfaces forming a substantial V-shape and extending axially in said opening.

6. A combination tool holder as set forth in claim 5 wherein each said V-shaped surface has a radial surface formed substantially at the center thereof and extending axially in said opening.

7. A combination tool holder as set forth in claim 4 wherein each said tool gripping element has a boss formed thereon.

8. A combination tool holder as set forth in claim 3 wherein a portion of said central opening disposed in each said tool gripping element comprises a pair of surfaces forming a substantial V-shape and extending axially in said opening.

9. A combination tool holder as set forth in claim 8 wherein each said V-shaped surface has a radial surface formed substantially at the center thereof and extending axially in said opening.

10. A combination tool holder as set forth in claim 9 wherein each said tool gripping element has a boss formed thereon.

11. A device for simultaneously performing a plurality of operations on a workpiece comprising:

a combination tool holder and a rotatable spindle for retaining said tool holder therein;

said tool holder comprising a substantially cylindrical body having a central opening provided at the forward end thereof and an outer surface having a rearwardly inwardly tapered portion;

at least one slot formed through said body and intersecting said central opening, said slot extending from the forward end of said body, rearwardly into said tapered portion;

a boss extending forwardly from said body, said boss having means for receiving and retaining tool means thereon;

said rotatable spindle comprising a forwardly facing cavity having a rearwardly inwardly tapered surface for receiving said rearwardly tapered surface of said tool holder body; and means for forcing said tool holder rearwardly into said cavity with said rotatable spindle and tool holder body rearwardly inwardly tapered surfaces in contact to thereby compress said tool holder body.

12. A device as set forth in claim 11 wherein said slot divides said tool holder into a pair of tool gripping elements.

13. A device as set forth in claim 12 wherein a portion of said central opening disposed in each said tool gripping element comprises a pair of surfaces forming a substantial V-shape and extending axially in said opening.

14. A device as set forth in claim 13 wherein each said V-shaped surface has a radial surface formed substantially at the center thereof and extending axially in said opening.

15. A device as set forth in claim 14 which further includes a drill bit having a substantially cylindrical surface received in said central opening between said gripping elements.

16. A device as set forth in claim 15 wherein each said tool gripping element has one of said bosses formed thereon.

* * * * *